(12) United States Patent
Yamazaki

(10) Patent No.: US 7,205,958 B2
(45) Date of Patent: Apr. 17, 2007

(54) IMAGE DISPLAY APPARATUS AND CAMERA AND IMAGE COMMUNICATION SYSTEM

(75) Inventor: Akihisa Yamazaki, Asaka (JP)

(73) Assignee: FujiFilm Corporation, Tokyo (JP)

( * ) Notice: Subject to any disclaimer, the term of this patent is extended or adjusted under 35 U.S.C. 154(b) by 399 days.

(21) Appl. No.: 10/712,107

(22) Filed: Nov. 14, 2003

(65) Prior Publication Data
US 2004/0105008 A1     Jun. 3, 2004

Related U.S. Application Data

(62) Division of application No. 09/199,427, filed on Nov. 25, 1998, now Pat. No. 6,670,933.

(30) Foreign Application Priority Data
Nov. 27, 1997 (JP) ................................ 9-325663

(51) Int. Cl.
*G00G 5/00* (2006.01)
(52) U.S. Cl. ............. 345/1.1; 340/825.29; 340/825.31; 340/825.34; 380/23; 709/207; 709/227
(58) Field of Classification Search ................. 345/1.1; 340/825.29, 825.31, 825.34; 358/906, 909.1; 380/23; 709/209, 227
See application file for complete search history.

(56) References Cited

U.S. PATENT DOCUMENTS 5,235,680 A     8/1993 Bijnagte
5,467,341 A    11/1995 Matsukane et al.
5,565,857 A *  10/1996 Lee ........................... 340/5.42
5,588,148 A *  12/1996 Landis et al. .................. 707/1
5,598,536 A *   1/1997 Slaughter et al. ........... 709/219

(Continued)

FOREIGN PATENT DOCUMENTS

JP          05-165932          7/1993

(Continued)

OTHER PUBLICATIONS

Masayuki Yamada; Image Filing Device; Pub. Date: Jul. 21, 1995, JP05323705.*

(Continued)

*Primary Examiner*—Bipin Shalwala
*Assistant Examiner*—Vincent E. Kovalick
(74) *Attorney, Agent, or Firm*—Birch, Stewart, Kolasch & Birch, LLP

(57) ABSTRACT

The camera reads identification information of the user, which is contained in an identification card, through a card reading part. The camera connects automatically to a server designated in accordance with the read identification information through a communication interface. Then, the camera transmits and stores the data of recorded images to the designated server. The camera retrieves the image data stored in the server, and reproduces and displays the image on an image display at the back of the camera. A plurality of cameras in which the same user's identification information is set can be controlled altogether in the image-recording and reproduction by one camera. One camera in which the identification information of a plurality of user's is set can distribute the recorded image data to the servers of the users simultaneously.

11 Claims, 12 Drawing Sheets

U.S. PATENT DOCUMENTS

| | | |
|---|---|---|
| 5,608,387 A | 3/1997 | Davies |
| 5,612,732 A * | 3/1997 | Yuyama et al. .......... 348/14.01 |
| 5,629,981 A | 5/1997 | Nerlikar |
| 5,640,253 A * | 6/1997 | Uchida et al. .............. 358/501 |
| 5,697,504 A | 12/1997 | Hiramatsu et al. |
| 5,703,795 A * | 12/1997 | Mankovitz .................. 715/721 |
| 5,756,978 A * | 5/1998 | Soltesz et al. .............. 235/380 |
| 5,905,983 A * | 5/1999 | Inomata et al. ................. 707/4 |
| 5,999,766 A * | 12/1999 | Hisatomi et al. ............. 399/80 |
| 6,005,678 A * | 12/1999 | Higashida et al. .......... 358/452 |
| 6,032,120 A | 2/2000 | Rock et al. |
| 6,085,247 A | 7/2000 | Parsons, Jr. et al. |
| 6,101,478 A | 8/2000 | Brown |
| 6,122,000 A | 9/2000 | Yee et al. |
| 6,298,376 B1 * | 10/2001 | Rosner et al. .............. 709/209 |

FOREIGN PATENT DOCUMENTS

| | | |
|---|---|---|
| JP | 6-113048 A | 4/1994 |
| JP | 08-315106 | 11/1996 |
| JP | 9-153099 A | 6/1997 |
| JP | 9-233453 A | 9/1997 |

OTHER PUBLICATIONS

Y. Ikenoue; Digital copier apparatus; Pub. Date: Feb. 25, 1994, JP06054143.*

* cited by examiner

F I G. 2
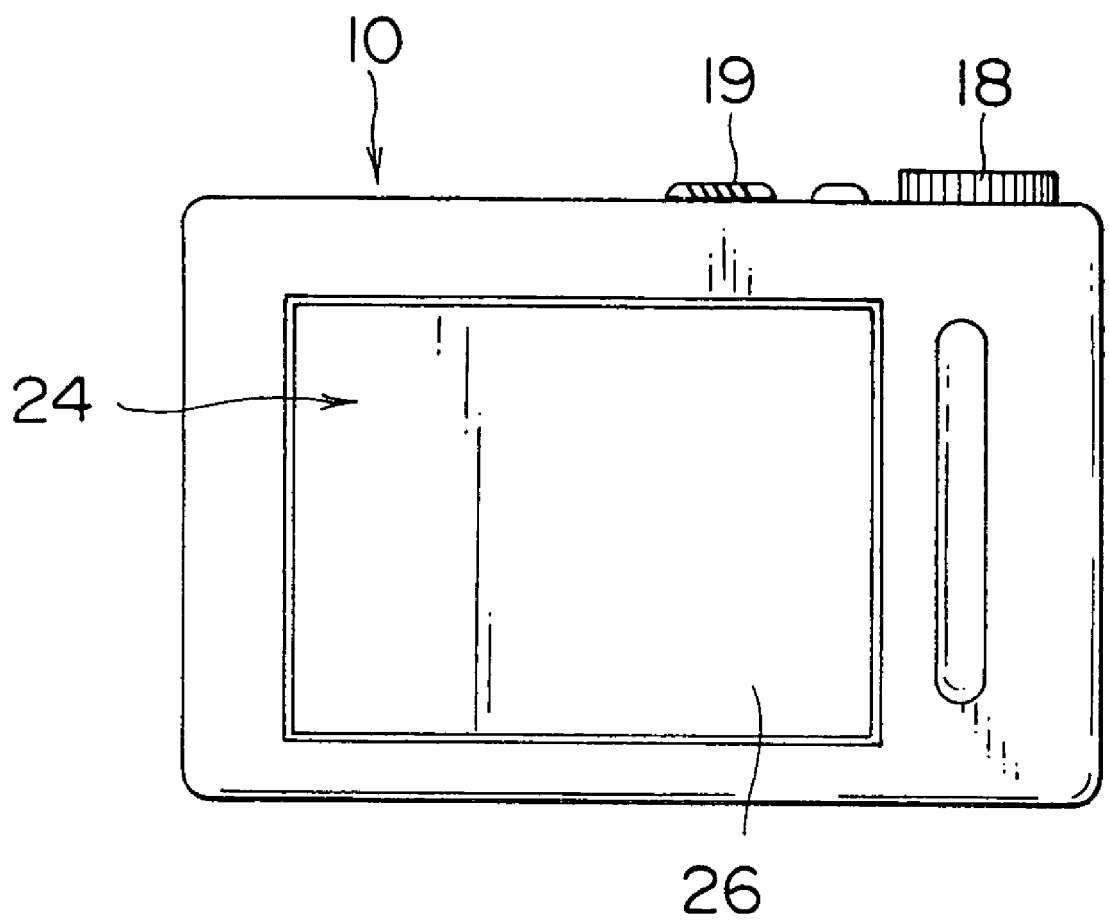

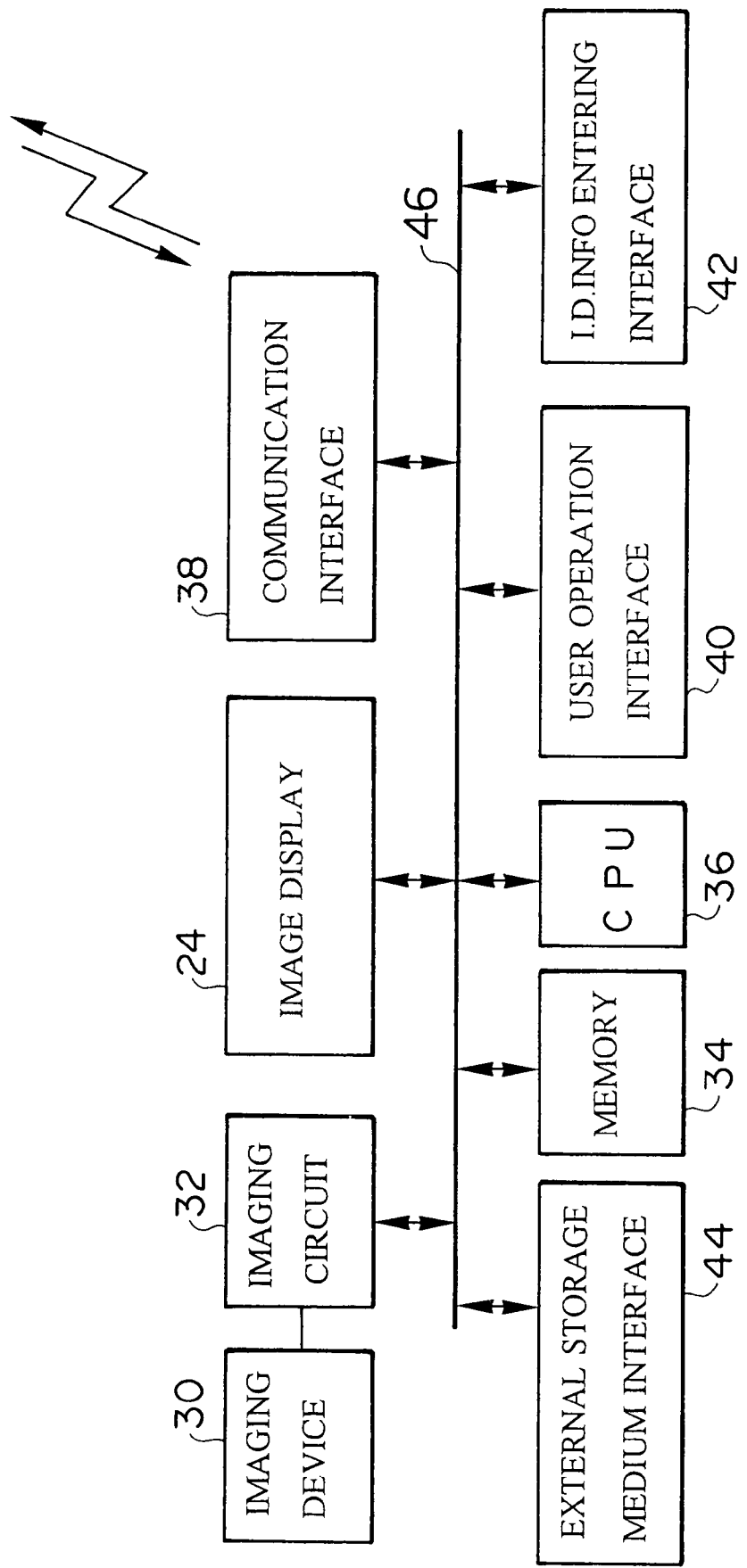
F I G. 3

F I G. 8
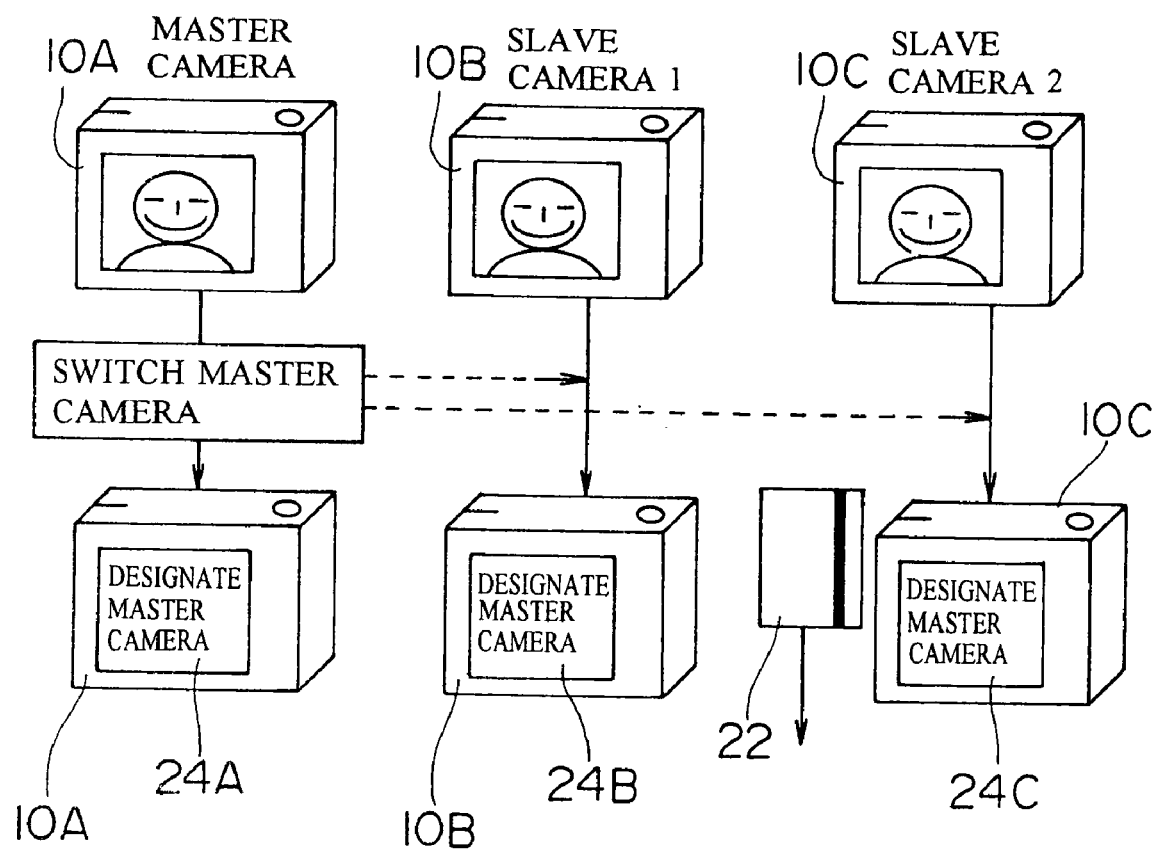

IMAGE DISPLAY APPARATUS AND CAMERA AND IMAGE COMMUNICATION SYSTEM

This application is a Divisional of application Ser. No. 09/199,427, filed on Nov. 25, 1998 now U.S. Pat. No. 6,670,933, the entire contents of which are hereby incorporated by reference and for which priority is claimed under 35 U.S.C. § 120; and this application claims priority of Application No. 9-325663 filed in Japan on Nov. 27, 1997 under 35 U.S.C. § 119.

BACKGROUND OF THE INVENTION

1. Field of the Invention

The present invention relates to an image display apparatus and a camera that are provided with functions of communicating with a server through a network and transmitting and receiving image data to and from the server, and an image communication system that distributes the image data by means of the image display apparatus, the camera and the server.

2. Description of Related Art

Recently, an information apparatus such as a digital camera and a personal digital assistant (PDA) that has an image display has been in common use. This apparatus is provided with a communication function of connecting to a computer network so that a variety of information can be exchanged. Japanese Patent Provisional Publication No. 8-315106 discloses a system that adds an identification signal of a cameraman to image data recorded with a digital camera for the purpose of distributing the recorded image with a charge. Specifically, the system adds the cameraman's identification signal to the recorded image data to thereby specify who is the cameraman of the recorded image (i.e., an original owner of the image data) distributed on the network. Then, the cameraman can charge a user of the distributed image for the use.

The conventional information apparatus such as the digital camera cannot store a number of images since the capacity of an internal memory is limited. The recorded image may be transmitted to the server to reduce the burden of the memory with the use of a technique disclosed in Japanese Patent Provisional Publication No. 8-315106. In this case, the use of the network and a database charges therefor, and it is therefore necessary to carefully designate a server to connect and identify the user. Japanese Patent Provisional Publication No. 8-315106, however, merely teaches adding the identification signal to the recorded image data to ensure the payment for the secondary use of the image data. It fails to teach designating the server to connect or to which the image data is transmitted.

Japanese Patent Provisional Publication No. 5-165932 discloses another system that makes it possible for a plurality of users to connect to a server at the same time so that they can edit the image data while they look at the same image.

A liquid crystal display (LCD) is used as the image display in many of apparatus that are provided with the above-mentioned image display function. If several persons look at the same screen, the image is sometimes difficult to see because of the direction of the liquid crystals. In this case, it is possible to distribute the image data to a plurality of apparatuses with the use of a technique disclosed in Japanese Patent Provisional Publication No. 5-165932 so that several persons can look at the same image on the plurality of displays at the same time. Japanese Patent Provisional Publication No. 5-165932, however, merely proposes a processing method in the case where several persons edit the same image. The mere application of this method has a problem described below. Since each person can freely enter a command from each apparatus, one person enters a command of "switch to the next image", whereas another person enters a command of an "enlargement", for example. If a rule were adopted in such a way that another command is not accepted during the processing of one command, an arbitrary operation of one person would influence all the other persons. It is therefore impossible to supervise the images that are distributed to all the persons.

SUMMARY OF THE INVENTION

The present invention has been developed in view of the above-described circumstances, and has as its object the provision of an image display apparatus and a camera that recognize who is using the apparatus (a user), communicate automatically with a server that is under contract with the user, and display the same image on a plurality of apparatuses while one of the apparatuses supervises the distribution of the images. Another object of the present invention is to provide an image communication system that makes possible the distribution of the image data by means of the above-mentioned apparatuses provided with the communication function.

To achieve the above-mentioned object, the present invention is directed to an image display apparatus comprising: an information reader for reading identification information from an external storage medium; a communicating device for communicating with a server through a network, the server being designated in accordance with the read identification information; and an image display for displaying an image represented by image data distributed from the server.

According to the present invention, the information reader reads the information contained in the external storage medium, and the identification information of a certain person contained in the external storage medium is entered into the image display apparatus. Then, a server is designated in accordance with the entered identification information, and the communicating device connects the image display apparatus automatically to the designated server. The image display apparatus receives the image data from the connected server, and displays the image represented by the image data on the image display.

The use of the external storage medium makes it easy to enter the identification information of the user into the image display apparatus and connect the image display apparatus to the server designated in accordance with the user.

According to another embodiment of the present invention, an image display apparatus comprises: an information reader for reading identification information from an external storage medium; a nonvolatile storage device for storing identification information of an owner of the image display apparatus; a user's identification information setting device for setting the owner's identification information as user's identification information if the information reader reads no identification information, and setting the identification information read by the information reader as the user's identification information if the information reader reads the identification information; a communicating device for communicating with a server through a network, the server being designated in accordance with the user's identification information; and an image display for displaying an image represented by image data distributed from the server.

Accordingly, once the owner of the image display apparatus records his or her own identification information in the own apparatus, it is possible to omit the entering of the identification information to use the own apparatus.

To erase previously-set user's identification information, a user's identification information erasing device may be adopted so that the user's identification information is erased when the image display apparatus is turned off. Further, a user's identification information updating device may be adopted so that when the information reader reads a new identification information, the set user's identification information is erased and the new identification information is set as the user's identification information.

Moreover, the image display apparatus further comprises a user's identification information confirmation device for, if the set user's identification information is other than the owner's identification information, requiring resetting of the user's identification information when a first preset time has elapsed after the setting of the set user's identification information, and erasing the set user's identification information when a second preset time has elapsed without the resetting after the requirement. The provision of this device prevents the user's identification information other than the owner's identification information from being fraudfully used. This provides security when a pay network, etc. is used.

It is also possible to use a plurality of image display apparatuses of the present invention. In this case, the image display apparatus further comprises: a cooperative mode designating device for designating the image display apparatus in either of a master mode and a slave mode with respect to at least one additional image display apparatus reading the same identification information that the image display apparatus reads; wherein the image display apparatus supervises the additional image display apparatus when the image display apparatus is in the master mode; wherein the image display apparatus is supervised by one of the additional image display apparatus when the image display apparatus is in the slave mode, the one of the additional image display apparatus being designated in the master mode by the cooperative mode designating device thereof.

According to the present invention, the identification information of one person is set as the user's identification information in the plurality of image display apparatuses, so that several persons can look at the same image displayed on the plurality of image display apparatuses. In particular, only the image display apparatus that is designated in the master mode is capable of manipulating the images such as switching, enlarging, and reducing. The master image display apparatus can supervise the images that displayed on the other image display apparatuses designated in the slave mode.

Moreover, the image display apparatus further comprises a communication mode designating device for designating the image display apparatus in either of an on-line mode and an off-line mode with respect to at least one additional image display apparatus reading the same identification information that the image display apparatus reads; wherein the image display apparatus supervises the additional image display apparatus when the image display apparatus is in the on-line mode and the master mode; wherein the image display apparatus is supervised by one of the additional image display apparatus when the image display apparatus is in the on-line mode and the slave mode, the one of the additional image display apparatus being designated in the master mode by the cooperative mode designating device thereof; wherein the image display apparatus operates independently of the additional image display apparatus when the image display apparatus is in the off-line mode. Accordingly, it is possible to satisfy a personal need to freely operate the image display apparatus without the control of the image display apparatus designated in the master mode.

To achieve the above-mentioned object, the present invention is directed to a camera comprising: an imaging part provided with an imaging optical system and an imaging device, an image of a subject being formed on a light receiving surface of the imaging device through the imaging optical system, the imaging device photoelectrically converting the image into an image signal; a signal processor for processing the image signal sent from the imaging device so as to produce image data; an information reader for reading identification information from an external storage medium; a communicating device for communicating with a server through a network, the server being designated in accordance with the read identification information; and a data transmitter for transmitting the image data to the server.

It is preferable that the camera further comprises an image display for displaying a first image captured by the imaging part and a second image represented by image data distributed from the server.

According to the present invention, the information reader reads the information contained in the external storage medium, and the identification information of a certain person contained in the external storage medium is entered into the camera. Then, a server is designated in accordance with the entered identification information, and the communicating device connects the camera automatically to the designated server. The transmission of the recorded image data to the connected server eliminates the necessity for providing the camera with a memory that stores a large amount of image data. Thus, the image-recording is performed without need to pay attention to the amount of the recorded image data.

It is also possible to use a plurality of cameras of the present invention. In this case, the camera further comprises: a camera communicating device for communicating with at least one additional cameras reading the same identification information that the camera reads; and a cooperative mode designating device for designating the camera in either of a master mode and a slave mode with respect to the additional cameras; wherein the camera supervises the additional camera through the camera communicating device when the camera is in the master mode; wherein the camera is supervised by one of the additional cameras through the camera communicating device when the camera is in the slave mode, the one of the additional cameras being designated in the master mode by the cooperative mode designating device thereof.

According to the present invention, the identification information of one person is set as the user's identification information in the plurality of cameras. One of these cameras is designated in the master mode, and all of the cameras can be controlled by operating only the camera designated in the master mode. It is therefore possible to perform a simultaneous image-recording such as a panoramic photography, a 360° photography, etc. using the plurality of cameras.

In order to increase the functions of the camera, the camera further comprises: an identification information storage device for storing identification information of a plurality of persons read by the information reader; and a communication controller for controlling the communicating device and the data transmitter such that the communicating device communicates with the server designated in accordance with the read identification information of each of the persons and the data transmitter transmits the image data to the designated server.

According to the present invention, the identification information of the plurality of persons can be set as the user's identification information in one camera, and the same image data is distributed simultaneously or sequentially to one or more of servers, each of which is designated in accordance with each of the plurality of persons. Thus, when the one camera performs the image-recording, the recorded image data can be distributed automatically to the one or more of servers, thus eliminating the necessity for extra printing.

According to another embodiment of the present invention, there is provided an information adding device for adding the identification information read by the information reader to the image data of the recorded image. If the identification information of each person who is a subject in the recorded image is entered into the camera in the case where several persons are snapshot, the identification information of the persons is attached to the recorded image data. The persons in the recorded image can be identified in accordance with the attached information, and thus, the recorded images are retrieved using the attached information.

To achieve the above-mentioned object, the present invention is directed to an image communication system comprising: at least one server provided with a storage device storing image data; a network capable of connecting to the server; an image display apparatus communicating with the server through the network, the image display apparatus comprising: an information reader for reading identification information from an external storage medium; a communicating device for communicating with the server through the network, the server being designated in accordance with the read identification information; and an image display for displaying an image represented by the image data distributed from the server; and a data distributor for distributing the image data from the server to the image display apparatus in accordance with a command given through the image display apparatus.

According to the present invention, the image display apparatus connects to the server designated in accordance with the identification information entered from the external storage medium, and receives the image data from the server. In this case, there may be provided a charge calculator for calculating a charge to a person designated with the entered identification information for at least one of using the network and using the image data. Consequently, it is possible to properly charge the person who receives the service.

To achieve the above-mentioned object, the present invention is directed to an image communication system comprises: at least one server provided with a storage device storing image data; a network capable of connecting to the server; a camera communicating with the server through the network, the camera comprising: an imaging part provided with an imaging optical system and an imaging device, an image of a subject being formed on a light receiving surface of the imaging device through the imaging optical system, the imaging device photoelectrically converting the image into an image signal; a signal processor for processing the image signal sent from the imaging device so as to produce image data; an information reader for reading identification information from an external storage medium; a communicating device for communicating with the server through the network, the server being designated in accordance with the read identification information; and a data transmitter for transmitting the image data to the designated server; and a transmitted data recording device for recording the transmitted image data in the designated server.

According to the present invention, the camera connects to the server designated in accordance with the identification information entered from the external recording medium, and transmits the recorded image data to the server so that the image data can be stored in the server. In this case, there may be provided a charge calculator for calculating a charge to a person designated with the entered identification information for at least one of using the network and recording the image data in the server. Consequently, it is possible to properly charge the person who receives the service.

The image communication system of the preset invention, wherein the camera further comprises: an information storage device for storing identification information of a plurality of persons read by the information reader; and an information transmitter for transmitting the read identification information of a first group of at least one of the persons to a second group of at least one of the server designated in accordance with the read identification information of a second group of at least one of the persons; wherein the image communication system further comprises: a data distributor for distributing the image data from the second group of the at least one of the server to a first group of at least one of the server designated in accordance with the transmitted identification information of the first group of the at least one of the persons; and a distributed data recording device for recording the distributed image data in the first group of the at least one of the server.

According to the present invention, the image data transmitted from the camera to one of the servers is distributed from the one server to the other servers, so that the image data recorded with the one camera can be distributed to the plurality of servers at the same time.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 2 is a back view of the camera in FIG. 1;

FIG. 3 is a block diagram illustrating the inner structure of the camera in FIG. 1;

FIG. 8 is a view of assistance in explaining a method of setting a master camera;

DETAILED DESCRIPTION OF THE PREFERRED EMBODIMENT

This invention will be described in further detail by way of example with reference to the accompanying drawings.

Figure 1:
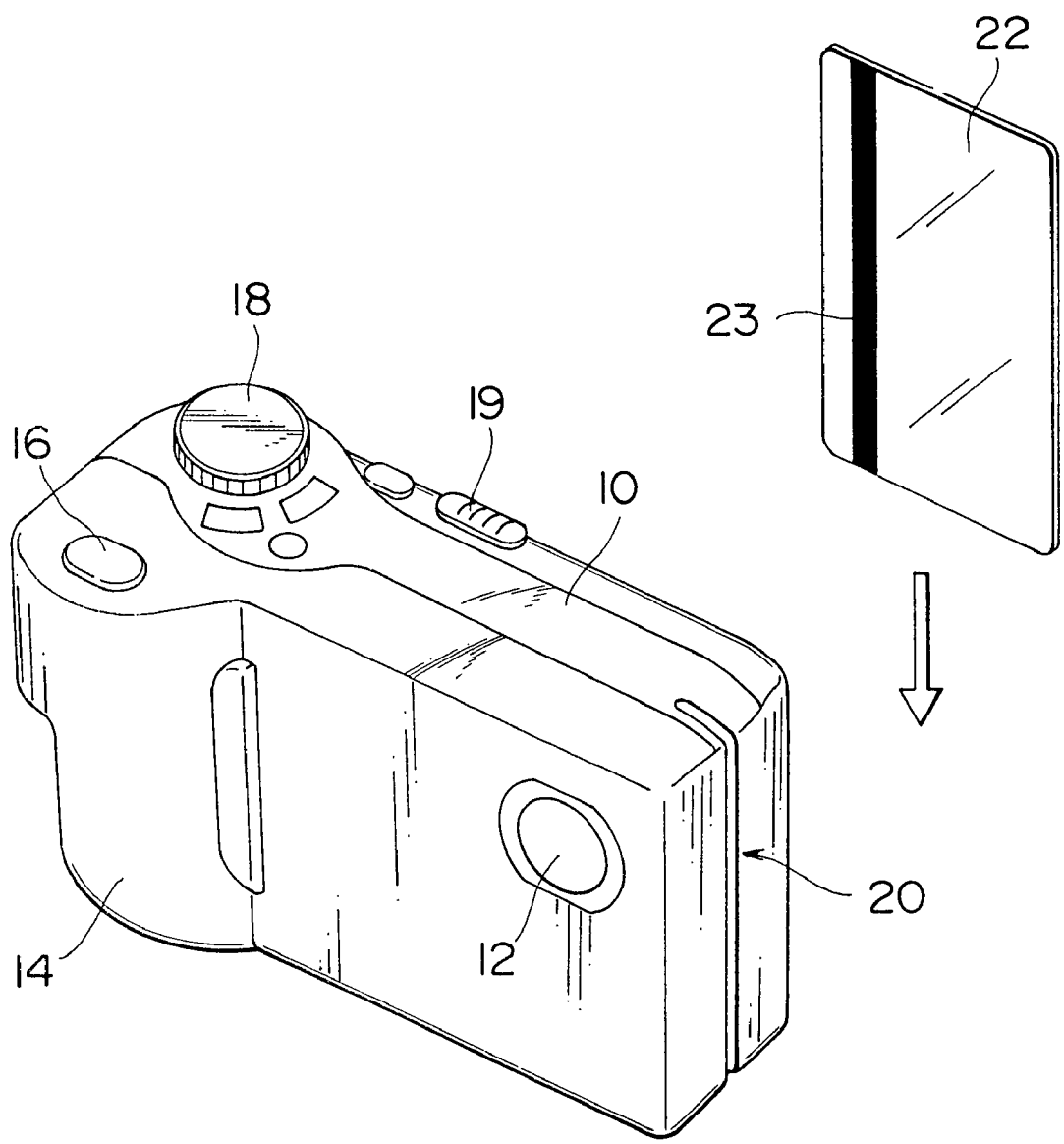
FIG. 1 is a perspective view illustrating the appearance of a camera according to an embodiment of the present invention.

FIG. 1 is a perspective view illustrating an example of a digital camera 10 according to an embodiment of the present invention. An imaging part 12 is provided at the upper right corner of the front of the camera 10, and a grip part 14 is formed at the left side of the camera 10. The imaging part 12 includes a taking lens and an imaging device such as a CCD arranged behind the taking lens. The taking lens is, for example, a rear focus type zoom lens, which is composed of a variable focal-length lens group and a compensator lens group.

A shutter release button or a record button 16, a mode dial 18, and a power switch 19 are provided on the top of the camera 10. An information reader or a card reading part 20 is provided at the right side of the camera 10. When an external storage medium or an identification card 22 is inserted into a groove of the card reading part 20, information contained in the identification card 22 is entered into the camera 10 through the card reading part 20.

A storage part 23 of the identification card 22 magnetically contains identification information of an owner of the identification card 22 such as name, sex, birthday, an owner's bank, and the number of an owner's bank account. In FIG. 1, the identification card 22 such as a credit card is read, but the external storage medium is not restricted to this. The external storage medium may be either of a magnetic card, an IC card, and a microchip. The external storage medium may be read electronically, magnetically, by radio, or by visible or invisible light, for example.

FIG. 2 is a back view of the camera 10 in FIG. 1. A single image display 24 is provided at the back of the camera 10. The image display 24 is, for example, an LCD, and a touch panel 26 is attached over the image display 24. Although not illustrated in detail, a variety of operation buttons are displayed on the image display 24, and a user can enter a variety of commands to the camera 10 through the touch panel 26 by touching the operation buttons.

FIG. 3 is a block diagram illustrating the inner structure of the camera 10 in FIG. 1. The camera 10 comprises the imaging device or the CCD 30, an imaging circuit 32, a memory 34, a central processing unit (CPU) 36, the image display or the LCD 24, a communication interface 38, a user operation interface 40, an identification information entering interface 42, and an external storage medium interface 44. These components connect to one another through a bus 46.

An image of the subject is formed on a light receiving surface of the CCD 30 through the taking lens of the imaging part 12, and the CCD 30 photoelectrically converts the image into an image signal, which is read sequentially. Although not illustrated in detail, the imaging circuit 32 includes a signal processor that comprises an analog processing circuit such as a CDS cramp circuit and a gain adjustment circuit, an A/D converter, a digital image processing circuit such as a luminance signal producing circuit, a color difference signal producing circuit and a gamma correction circuit, and so forth. The image signal sent from the imaging part 12 is processed in the imaging circuit 32, and it is stored in the memory 34 (e.g., a flash memory built in the camera 10) based on an exchangeable image file format (Exif) or another format. The image signal may be stored in a detachable external storage medium such as a memory card through the external storage medium interface 44.

The image signal read from the imaging part 12, the memory 34 or the detachable external storage medium is processed in the signal processor, and the processed image signal is sent to the image display 24 so that the captured images can be shown on the image display 24. The image display 24 shows not only still images recorded upon the pressing of the record button 16 but also moving images and/or intermittently moving images captured before the record button 16 is pressed.

The camera 10 has a well-known automatic exposure adjustment (AE) function and an auto-focus (AF) function. Directing the camera 10 to the subject enables the optimum exposure and focus adjustments to be performed automatically.

The camera 10 is able to communicate with a server on a computer network through the communication interface 38. The camera 10 transmits the information such as the image data of the recorded image to the server, and receives the information such as the image data from the server.

The user operation interface 40 produces a display control signal for displaying the operation buttons on the image display 24, and receives operation signals from the touch panel 26 and the operation parts such as the record button 16 and the mode dial 18 provided on the body of the camera 10.

The identification information entering interface 42 sends a reading control signal to the card reading part 20, and receives the information read from the identification card 22 through the card reading part 20.

The CPU 36 supervises the circuits in the camera 10. The CPU 36 controls the circuits according to the signals from the user operation interface 40. The CPU 36 also controls the imaging part 12 to zoom and focus so as to capture images, controls the display on the image display 24, controls the reading/writing of the data in the memory 34, and controls the communication with the server.

Figure 4:
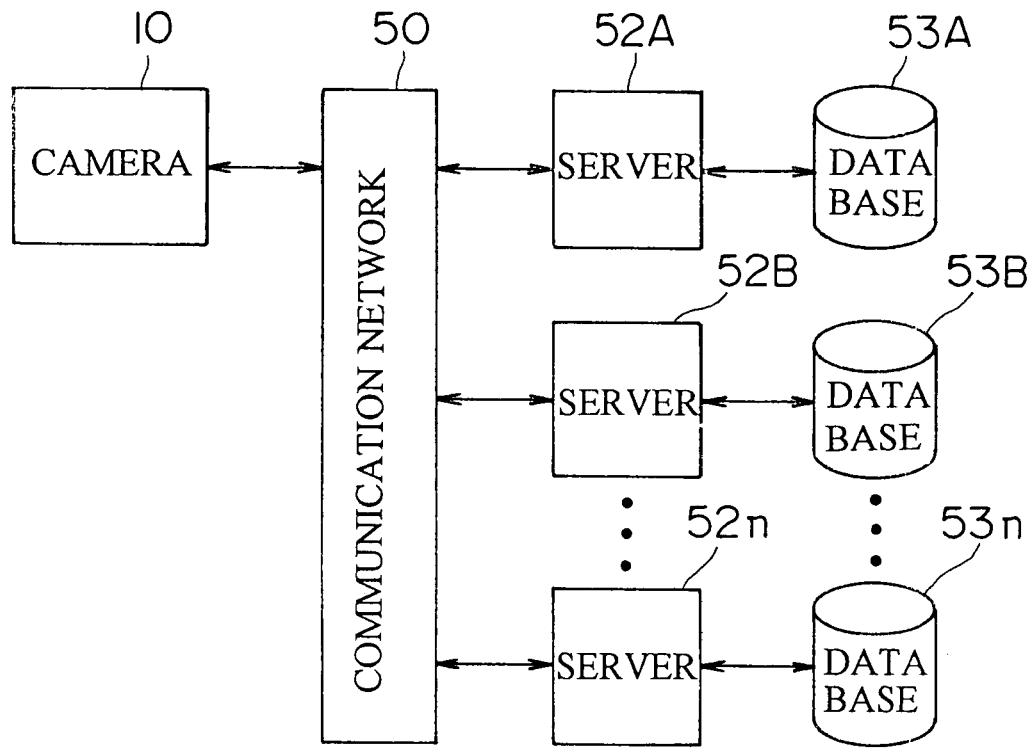
FIG. 4 is a block diagram illustrating the structure of an image communication system according to an embodiment of the present invention.

FIG. 4 is a block diagram illustrating the structure of an image communication system according to an embodiment of the present invention.

The camera 10 has access to the servers 52A, 52B, . . . , 52n through the network 50 such as a public telephone network or a special network. FIG. 4 shows a computer network that includes a plurality of servers, but the number of servers is not particularly restricted and is at least one.

The servers 52A, 52B, . . . , 52n have databases 53A, 53B, . . . , 53n, respectively, that store the image data. The image data recorded with the camera 10 is transmitted to the servers 52A, 52B, . . . , 52n and is recorded in the databases 53A, 53B, . . . , 53n. The image data recorded in the database can be distributed to the camera 10 and any other server.

A person who uses the camera 10 (a user) makes a contract to use a certain server or arranges a home server at home (e.g., the server 52A). Then, the user can record the own image data in the database 53A through the server 52A and retrieve the image data recorded in the database 53A to reproduce the image on the image display 24 of the camera 10.

A description will be given of the operation of the camera and the image communication system which are constructed in the above-mentioned manner.

Figure 5:
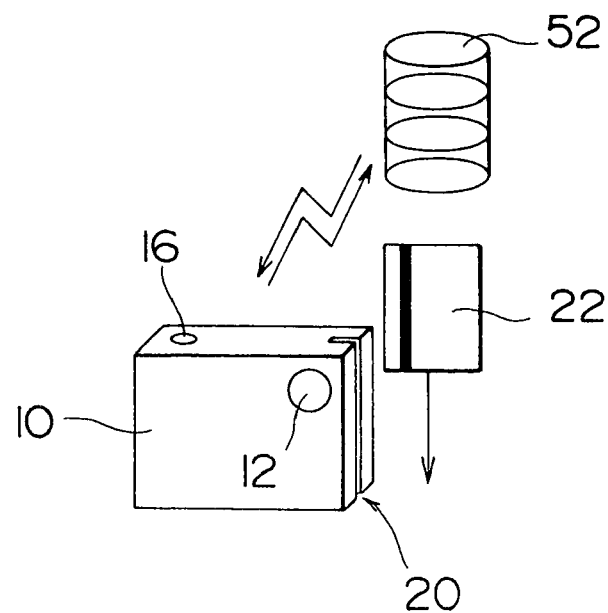
FIG. 5 is a conceptional view describing an embodiment in which the camera is used.

FIG. 5 is a conceptional view describing an embodiment in which the camera 10 is used. First, the identification card 22, such as the credit card, of the user is inserted into the card reading part 20 of the camera 10 so that the identification information contained in the identification card 22 is entered into the camera 10. The entered identification information is set as the user's identification information. According to the set user's identification information, the server to which the camera 10 connects is designated, and who (and which account) will be charged for using the network and the server is determined.

If, however, an owner of the camera 10 uses the camera 10, it is inconvenient to enter the identification information of the owner every time the owner uses the camera 10. It is therefore preferable to enter previously the identification information from the identification card 22 of the owner and record the entered identification information as an owner's identification information in a memory such as a nonvolatile memory in the camera 10. Then, when no identification information is entered through the card reading part 20, the owner's identification information may be set as the user's identification information.

After the setting of the user's identification information, when the record button 16 of the camera 10 is pressed and the image-recording is performed, the camera 10 selectively connects to one (e.g., the server 52A) of the servers 52A, 52B, . . . , 52n in accordance with the user's identification information automatically. Then, a condition of the communication with the server 52A is evaluated, and the data of the recorded image is transmitted to the server 52A when the condition is satisfactory. The image data transmitted to the server 52A is recorded in a predetermined recording region of the server 52A or the database 53A.

Figure 6:
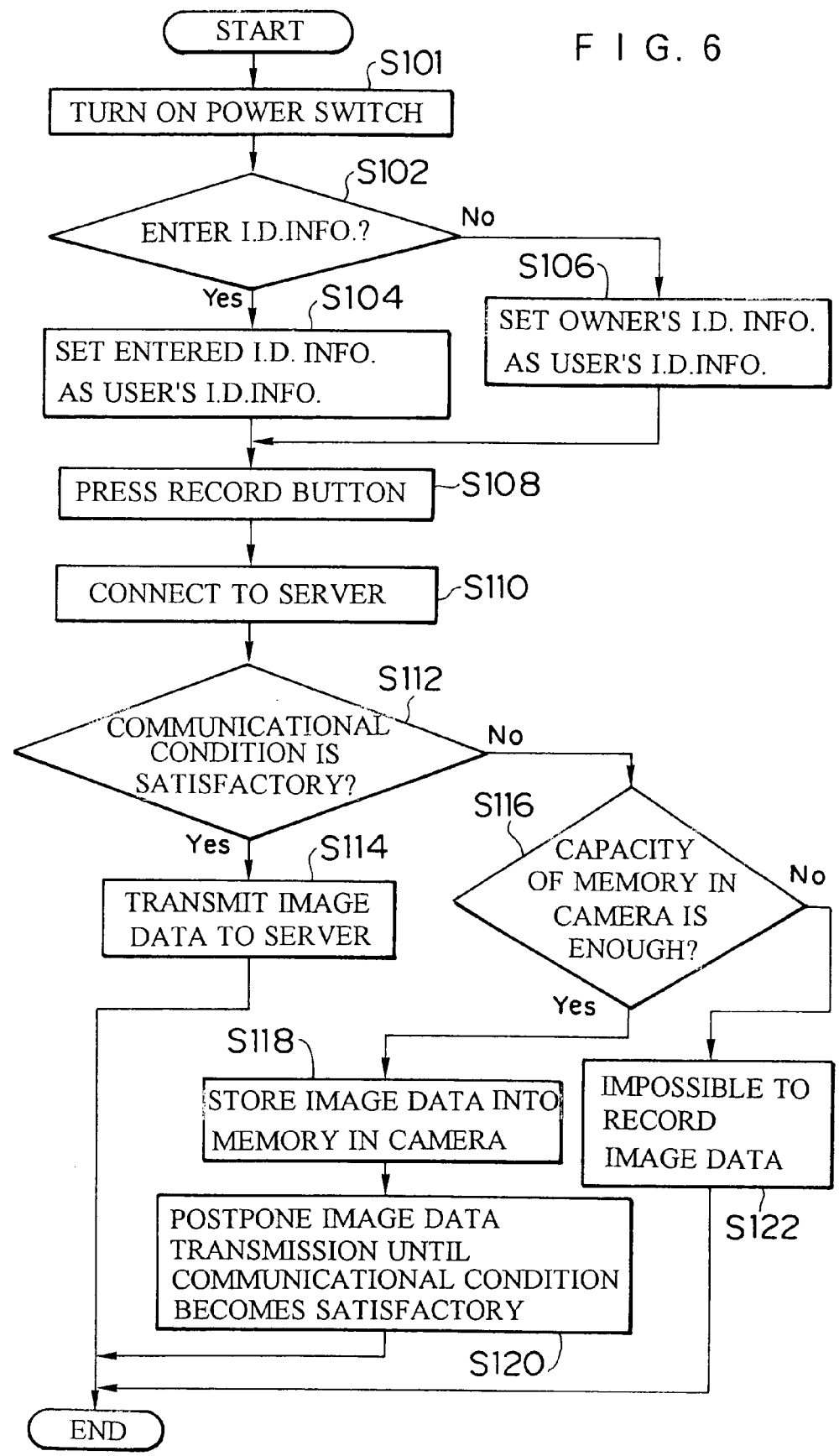
FIG. 6 is a flow chart showing the flow of setting of user's identification information and image data transmission in image recording.

FIG. 6 is a flow chart showing the flow of the above processing. When the power switch 19 of the camera 10 is turned on (S101), whether to enter the identification information of the user is determined (S102). To enter the identification information, the identification card 22 such as the credit card is inserted into the card reading part 20, and the identification information read from the identification card 22 is set as the user's identification information (S104). On the other hand, if no identification information is entered at S102, the previously-recorded owner's identification information is set as the user's identification information (S106). A server to which the camera 10 connects and a person who will be charged are determined in accordance with the set user's identification information.

Then, the camera 10 waits for a command to perform the image-recording. When the record button 16 is pressed (S108), the camera 10 connects to the designated server 52 (S110). After the connection to the server 52, the condition of the communication with the server 52 is evaluated (S112). If the communicational condition is determined as being satisfactory, the data of the recorded image is transmitted from the camera 10 to the server 52 and is recorded in the predetermined recording region of the server 52 or the database 53 (S114).

On the other hand, if the communicational condition is determined as being unsatisfactory at S112, the capacity of the memory 34 built in the camera 10 is evaluated (S116). If there is enough storage capacity (more than a predetermined level), the image data is temporarily stored in the memory 34 (S118). Then, the image data transmission to the server 52 is postponed until it is determined that the communicational condition becomes satisfactory (S120). Specifically, if the communicational condition is determined as being unsatisfactory, the communication is suspended, and the communicational condition is evaluated again after a predetermined period of time has elapsed. The waiting for the predetermined period of time and the evaluation of the communicational condition are repeated until the communicational condition becomes satisfactory. When the communicational condition becomes satisfactory, the image data stored in the memory 34 is transmitted to the server 52. There may be a limitation on the time for waiting for the improvement of the communicational condition, and the communication may be abandoned if the communicational condition keeps unsatisfactory in a predetermined time.

If there is not enough capacity of the memory 34 at S116, the image data of the recorded image cannot be stored (S122). Then, a warning of the impossibility of the image-recording is displayed on the image display 24, and the procedure ends.

In the flow chart of FIG. 6, the camera 10 connects to the server 52 after the record button 16 is pressed, but the camera 10 may also connect to the server 52 just after the setting of the user's identification information so as to evaluate the communicational condition.

When the user's identification information is set, the identification information for designating the server to which the camera 10 connects and the identification information for determining the person who will be charged for using the network and using the server may be set separately. For instance, it is possible to designate the server in accordance with the owner's identification information, and determine the charged person in accordance with the user's identification information.

If both the owner's identification information and the user's identification information are set, it is preferable to provide a function of confirming the user's identification information repeatedly at regular intervals. Specifically, every time a first predetermined period of time has elapsed after the entering of the currently-set user's identification information, it is required to reenter the user's identification information. For the reentering, the identification card 22 that has been used for the entering of the currently-set user's identification information is reinserted in the card reading part 20. If the reentering is not performed by a second predetermined period of time after the requirement, the currently-set user's identification information is erased. Thus, when the person other than the owner uses the camera 10, the user must always carry the identification card 22 (e.g., the credit card), which is effective for security.

A description will be given of examples in which the currently-set user's identification information is erased. There is a variety of ways to erase the user's identification information set in the camera 10 as described below.

(1) When the power switch 19 of the camera 10 is turned off, the currently-set user's identification information is erased. When the power switch 19 of the camera 10 is turned on next time, it is required again to enter the identification information to be set as the user's identification information. If no identification information is entered into the camera 10 on the setting of the user's identification information, the owner's identification information is set as the user's identification information in the camera 10.

(2) To erase the user's identification information while the power of the camera 10 keeps on, the mode dial 18, the operation button, etc. are operated to switch the camera 10 to a user's identification information erasing mode. Then, the user's identification information is erased upon the entering of a command to erase it through the operation buttons. In this case, a message is preferably displayed on the image display 24 to indicate that the user's identification information has been erased.

(3) When new identification information is entered into the camera 10, the currently-set user's identification information is erased, and the new identification information is then set as a new user's identification information. However, if the camera 10 is in a mode for setting the identification information of a plurality of persons as the user's identification information, this automatic updating function is suspended.

(4) If the identification card 22 is such as the magnetic card, which is inserted or touched to the camera 10 so that the identification information is entered into the camera 10, the camera 10 automatically switches into an identification information confirmation mode repeatedly at regular intervals to require the user to reenter the currently-set user's identification information. Then, the currently-set user's identification information is erased automatically if the identification card 22 is not reinserted or retouched while the camera 10 is in the identification information confirmation mode. On the other hand, if the identification information is entered from the identification card 22 into the camera 10 without inserting or touching of the identification card 22 to the camera 10 (e.g., by radio, by visible or invisible light, etc.), the currently-set user's identification information is erased automatically upon determination that the identification card 22 is apart from the camera 10 (i.e., the set user stops using the camera 10, and another person starts using the camera 10) when the camera 10 looses contact with the identification card 22 for a predetermined period of time. It is therefore possible to prevent the user's identification information from being used without permission and secure the security. If the user's identification information is erased in these methods, the owner's identification information is automatically set as the user's identification information.

The above methods (1)–(4) are convenient because there is required no complicated process of entering a personal identification number, password, etc. to erase the user's identification information. On the other hand, with respect to the owner's identification information, it is preferable to require the process of entering the personal identification number, password, etc. of the owner so as to make it difficult to erase the owner's identification information.

A description will be given of a mode of setting the identification information of one person as the user's identification information in a plurality of cameras.

Figure 7:
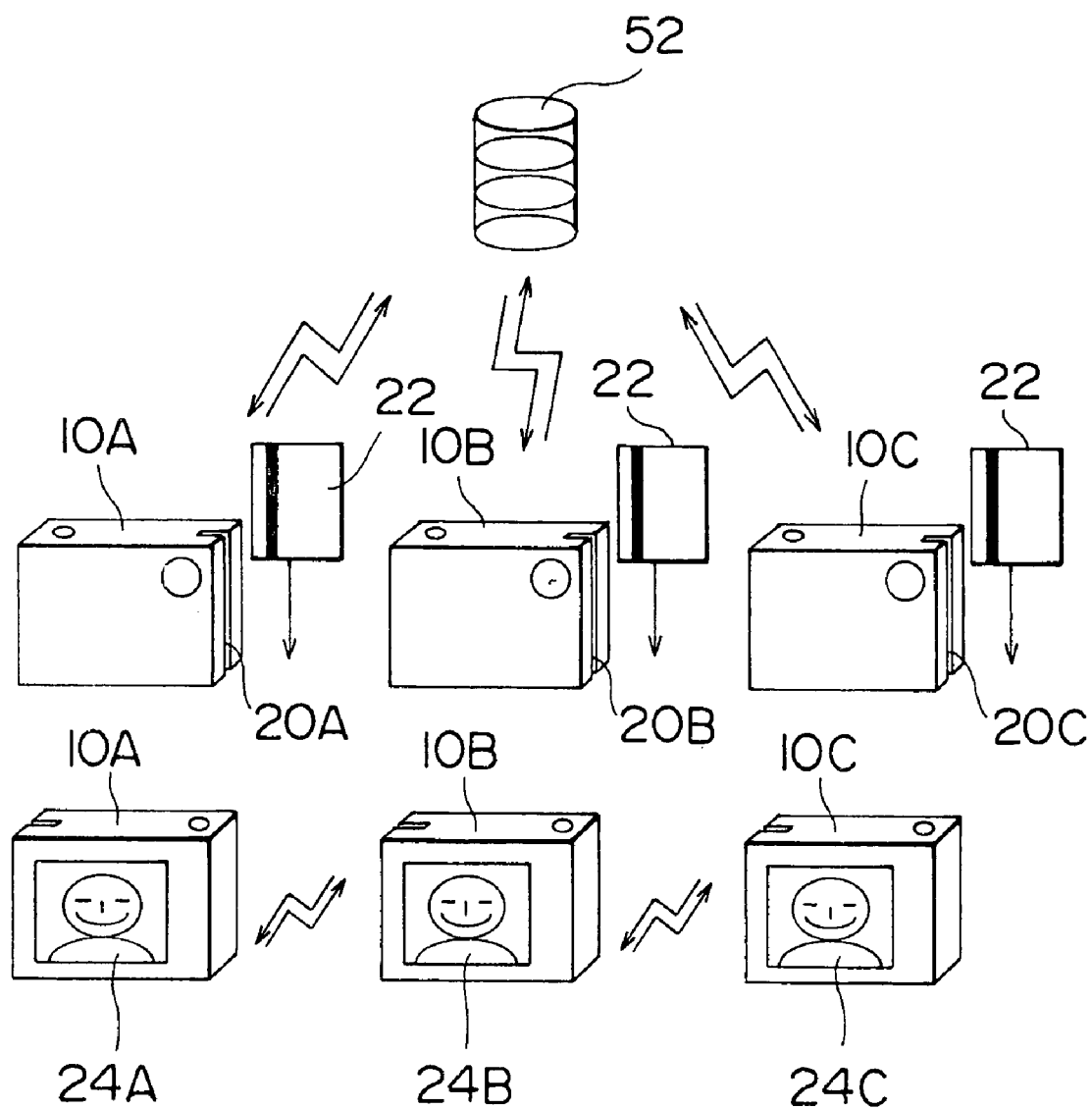
FIG. 7 is a conceptional view describing an example in which the same user's identification information is set in a plurality of cameras.

FIG. 7 is a conceptional view describing the mode in which the identification information of one person is set as the user's identification information in a plurality of cameras. In FIG. 7, one identification card 22 is used to enter the identification information of the one person into three cameras 10A, 10B & 10C. When the same identification card 22 is inserted sequentially into card reading parts 20A, 20B & 20C of the cameras 10A, 10B & 10C, respectively, the identification information of the one person is set as the user's identification information in the cameras 10A, 10B & 10C.

If the same user's identification information is set in the cameras 10A, 10B & 10C, the cameras 10A, 10B & 10C connect simultaneously or sequentially to the same server 52 and can be distributed with the same image data from the server 52. Consequently, the same image is shown on the image displays 24A, 24B & 24C of the cameras 10A, 10B & 10C, respectively, eliminating the conventional inconvenience when some persons look at one LCD monitor.

If the cameras 10A, 10B & 10C are provided with devices for communicating with one another, the image data may be distributed to the cameras 10A, 10B & 10C as follows. Only one camera (e.g., the camera 10A) connects to the server 52, and receives the image data from the server 52. Then, the camera 10A distributes the image data to the other cameras (the cameras 10B & 10C). This reduces the charges for using the network 50 and the server 52.

When the same user's identification information is set in the cameras 10A, 10B & 10C, they may be used separately, but they also be controlled altogether in accordance with operation of one of them. Specifically, the one of the cameras 10A, 10B & 10C is designated as a master camera among the cameras in which the same user's identification information is set. The cameras other than the master camera are designated as slave cameras, which are controlled through the master camera.

For instance, in the user's identification information setting mode, the camera in which the user's identification information is set first is designated as the master camera. The first set camera (e.g., the camera 10A) connects to the server 52 first. Then, when the next set camera (e.g., the camera 10B) connects to the server 52, the server 52 can recognize that the camera having the same user's identification information (i.e., the camera 10A) has already connected to the server 52. The master camera and the slave cameras are thus determined in accordance with an order in which the cameras connect to the server 52.

To switch the master camera, a command to switch the master camera is entered to the master camera 10A as shown in FIG. 8. Then, all the cameras 10A, 10B & 10C, in which the same user's identification information is set, switch to a master camera designating mode, and a message is shown on the image displays 24A, 24B & 24C to require the user to designate the master camera. When the identification information is entered into a desired camera (e.g., the camera 10C) or the identification card 22 is inserted into the camera 10C, the camera 10C is designated as a new master camera.

After the designation of the master/slave cameras, the master camera is operated to control the action of all cameras. For example, if the master camera is operated to switch reproduced images on a frame-by-frame basis in an image-reproducing mode, images displayed on all the cameras are switched on a frame-by-frame basis. If a command to enlarge or reduce the reproduced image is entered into the master camera, the images displayed on all the cameras are enlarged or reduced. Such a function enables the cameras to be used not only for the image-recording but also as a presentational tool at a conference.

Moreover, operating the master camera controls the image-recording, etc. of all of the cameras, in which the same user's identification information is set. It is therefore easy to realize a synchronous image-recording such as a panoramic photography and a 360° photography using the plurality of cameras.

Figure 9:
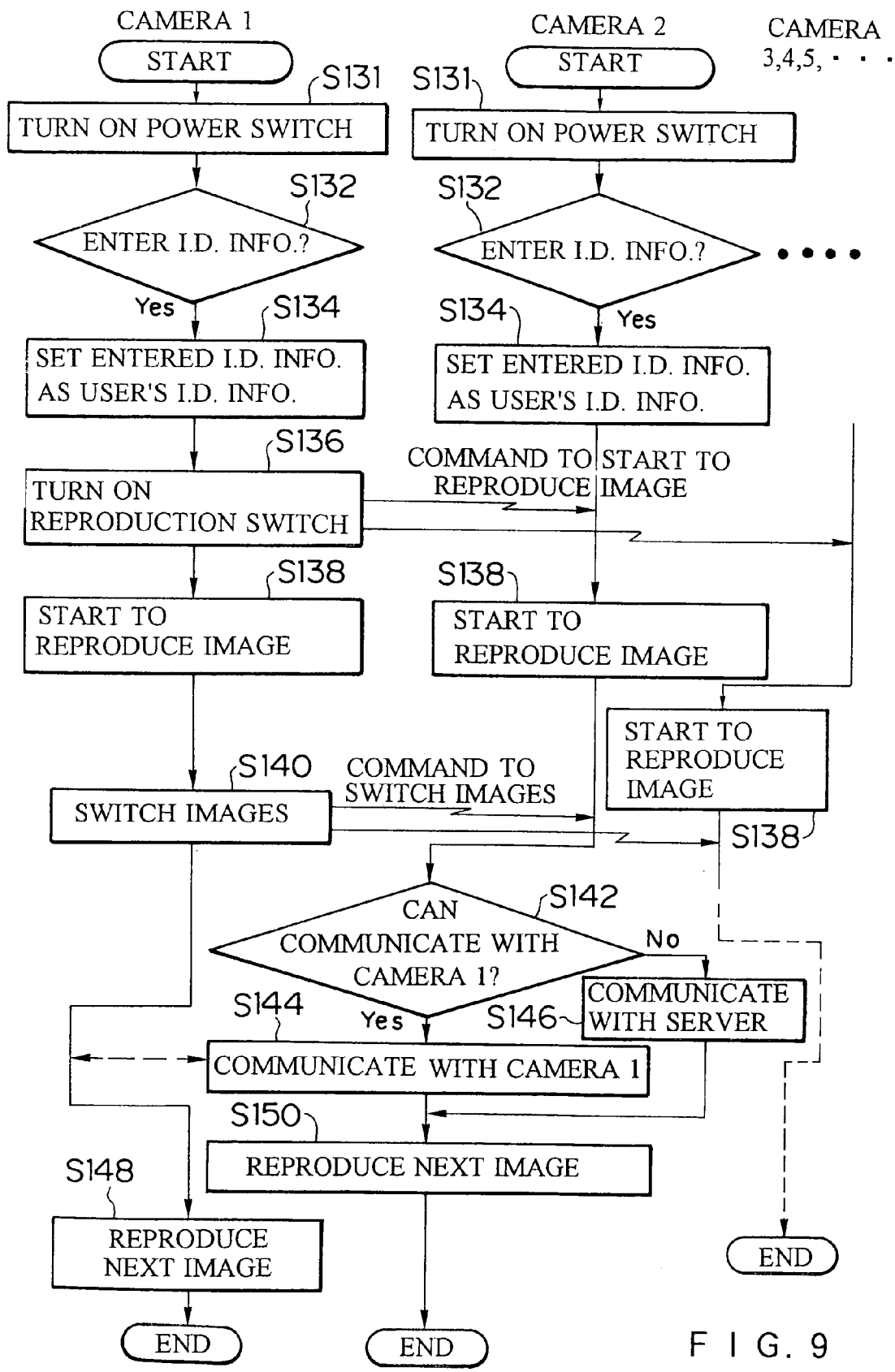
FIG. 9 is a flow chart showing the flow of a reproduction process in the case where the same user's identification information is set in a plurality of cameras.
Figure 10:
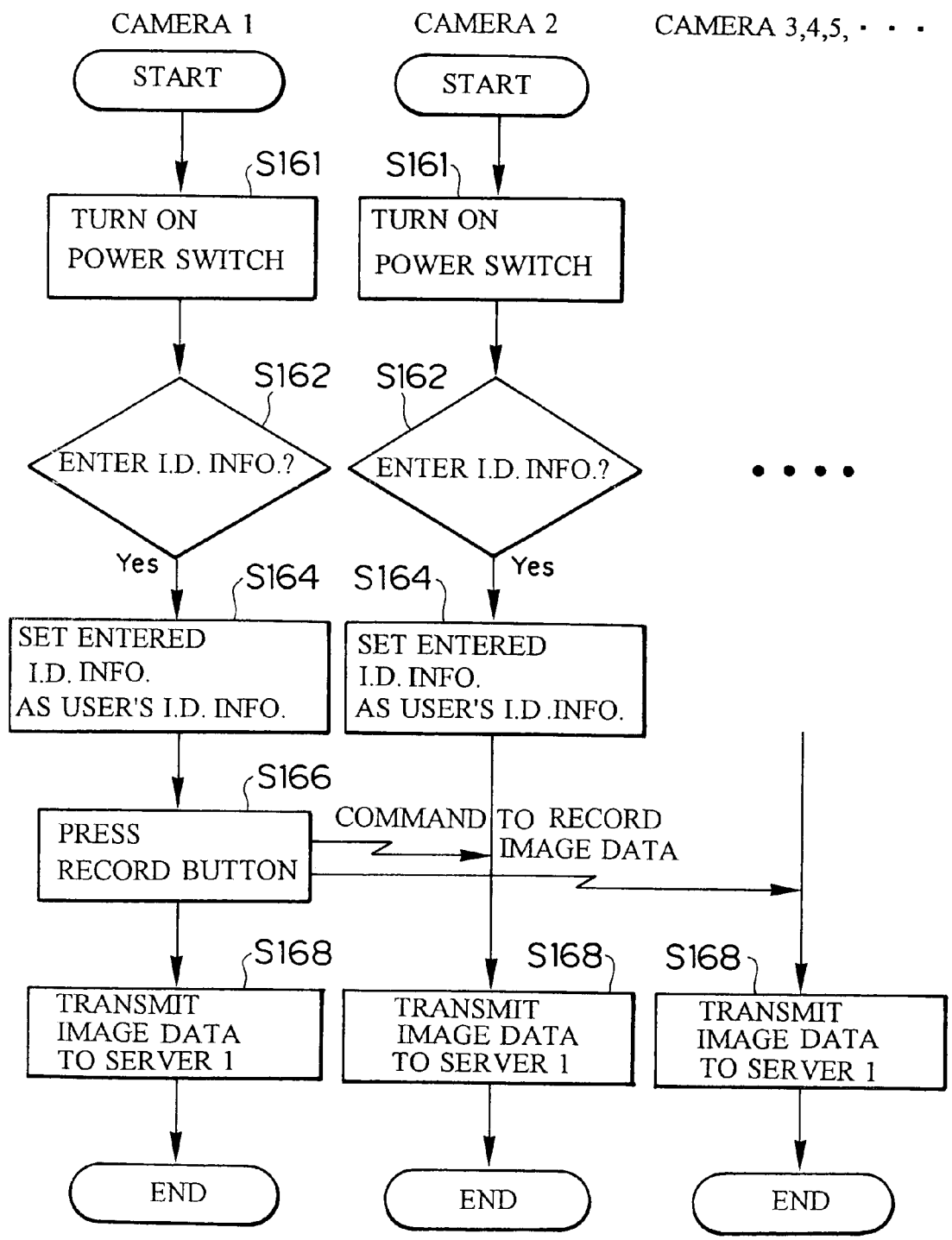
FIG. 10 is a flow chart showing the flow of an image-recording process in the case where the same user's identification information is set in a plurality of cameras.

FIGS. 9 and 10 are flow charts showing the flow of the above processing.

FIG. 9 shows the flow of the processing in the case where the same user's identification information is set in a plurality of cameras, which reproduce images. When the power switch of each camera (camera 1, camera 2, . . . ) is turned on (S131), whether to enter identification information to be set as the user's identification information is determined in each of the cameras (S132). Although not illustrated, if no identification information is entered, the owner's identification information is set as the user's identification information as is the case with S106 in FIG. 6, and the normal (no cooperation with any other camera) image-recording or image-reproduction is then started.

To enter the user's identification information at S132, the same identification card is inserted sequentially into each of the cameras (the cameras 1, 2, . . . ) (S134). The camera into which the identification card is inserted first (e.g., the camera 1) is designated as the master camera.

If a reproduction switch of the master camera (the camera 1) is turned on (S136), a command to start to reproduce an image is issued to all the slave cameras (the cameras 2, 3, . . . ). Then, each of the master camera and the slave cameras connects to the server 52 and retrieves the image data from the server 52 to reproduce the image (S138). If the cameras can communicate with one another, only the master camera may receive the image data from the server 52 and distribute the image data to the slave cameras.

When the master camera receives a command to switch the images on a frame-by-frame basis (S140), this command is issued to all the slave cameras. Then, the master camera retrieves the image data of the next frame from the server 52 in accordance with the command, and the master camera reproduces the next image (S148). On the other hand, each of the slave cameras determines whether it can communicate with the master camera (S142). If the slave camera can communicate with the master camera, the slave camera is distributed with the image data of the next frame from the master camera (S144). If the slave camera cannot communicate with the master camera, the slave camera retrieves the image data of the next frame from the server 52 directly (S146). Then, the slave cameras reproduce the next image (S150).

As the frame-by-frame switching process shown in FIG. 9, the enlargement and reduction processes may be performed in the same manner. Thus, the same image can be displayed on all the cameras, and the master camera can control all the images distributed to all the cameras.

Each of the cameras may be provided with a communication mode designating device for designating the camera in either of an on-line mode and an off-line mode so as to meet a requirement to display the image freely without the control of the master camera when the same image is displayed on the plurality of cameras. If a person would like to observe the image by himself, his camera is switched to the off-line mode to operate independently of the master camera temporarily. Then, when the camera is switched to the on-line mode, the camera starts the processing in the same manner as the other cameras and returns to the group that is controlled by the master camera.

FIG. 10 shows the flow of the processing in the case where the identification information of one person is set as the user's identification information in a plurality of cameras, which record images. When the power switch of each camera (camera 1, camera 2, . . . ) is turned on (S161), whether to enter identification information to be set as the user's identification information is determined in each of the cameras (S162). Although not illustrated, if no identification information is entered, the owner's identification information is set as the user's identification information as is the case with S106 in FIG. 6, and the normal (no cooperation with any other camera) image-recording or image-reproduction is then started.

To enter the user's identification information at S162, the same identification card 22 is inserted sequentially into each of the cameras (the cameras 1, 2, . . . ) (S164). The camera into which the identification card 22 is inserted first (e.g., the camera 1) is designated as the master camera.

When the record button 16 of the master camera is pressed to record image data, the command to record image data is issued to all the slave cameras. Then, each of the master camera and the slave cameras connects to the common server 52 and transmits the image data of the recorded image to the server 52 (S168). Thus, the pressing the record button 16 of the master camera causes the image-recording of all the cameras. It is particularly advantageous if there is a necessity for the synchronous image-recording as in the panoramic photography.

Figure 11:
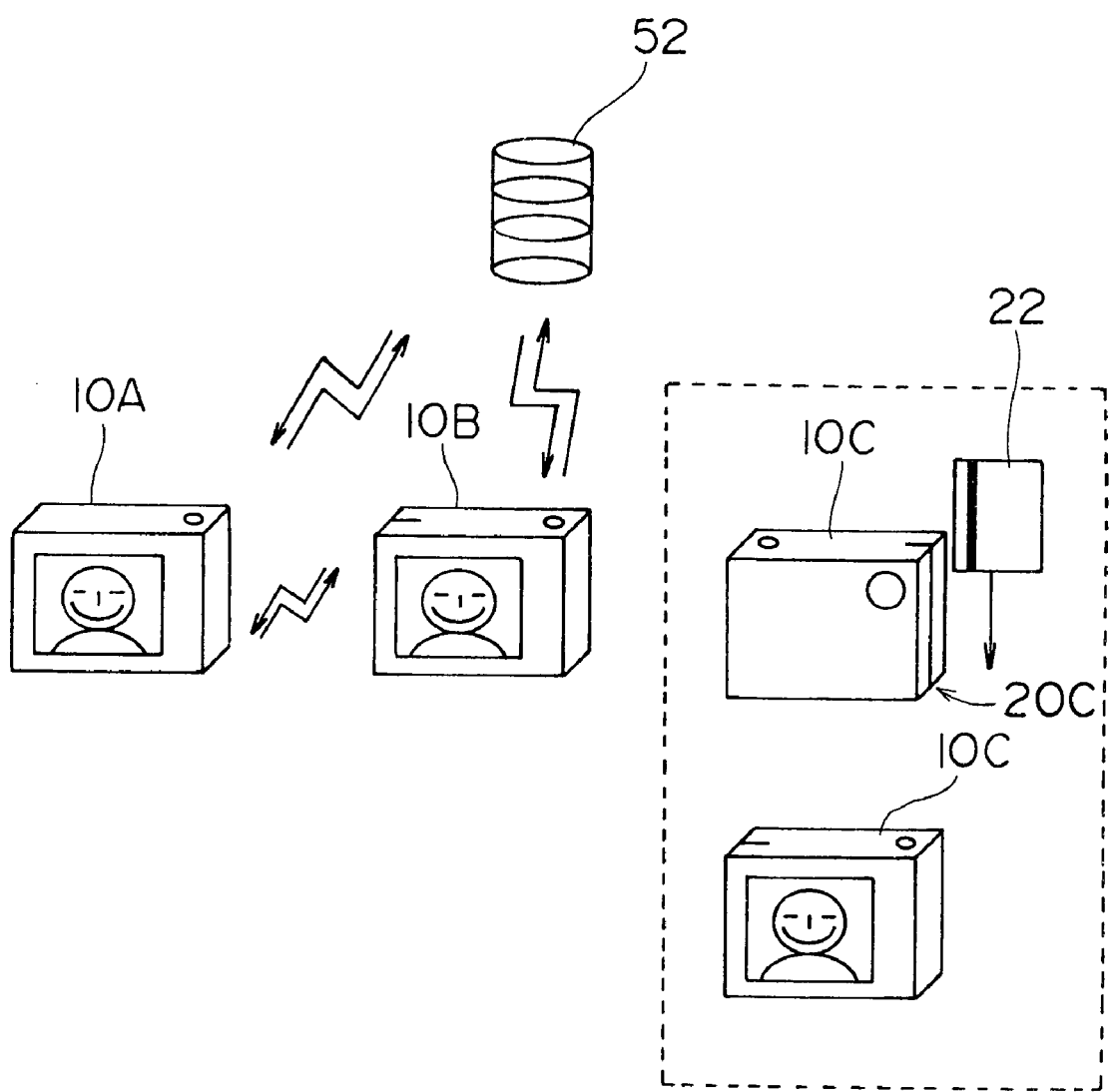
FIG. 11 is a conceptional view of assistance in explaining a function of entering to a group in the middle of the reproduction.

FIG. 11 is a conceptional view describing another embodiment in which the identification information of one person is set as the user's identification information in a plurality of cameras. In the middle of the reproduction in the state wherein the same user's identification information is set in two cameras 10A & 10B, the same user's identification information may be set in the camera 10C.

If the identification card 22 is inserted into the card reading part 20C of the camera 10C to set the same user's identification information as in the two cameras 10A & 10B while the two cameras 10A & 10B are performing the reproduction, the same image is displayed on the camera 10C in synchronism with the two cameras 10A & 10B. Thus, the camera 10C can join the group anytime during the reproduction.

A description will be given of an embodiment in which the identification information of a plurality of persons is set as the user's identification information in one camera.

Figure 12:
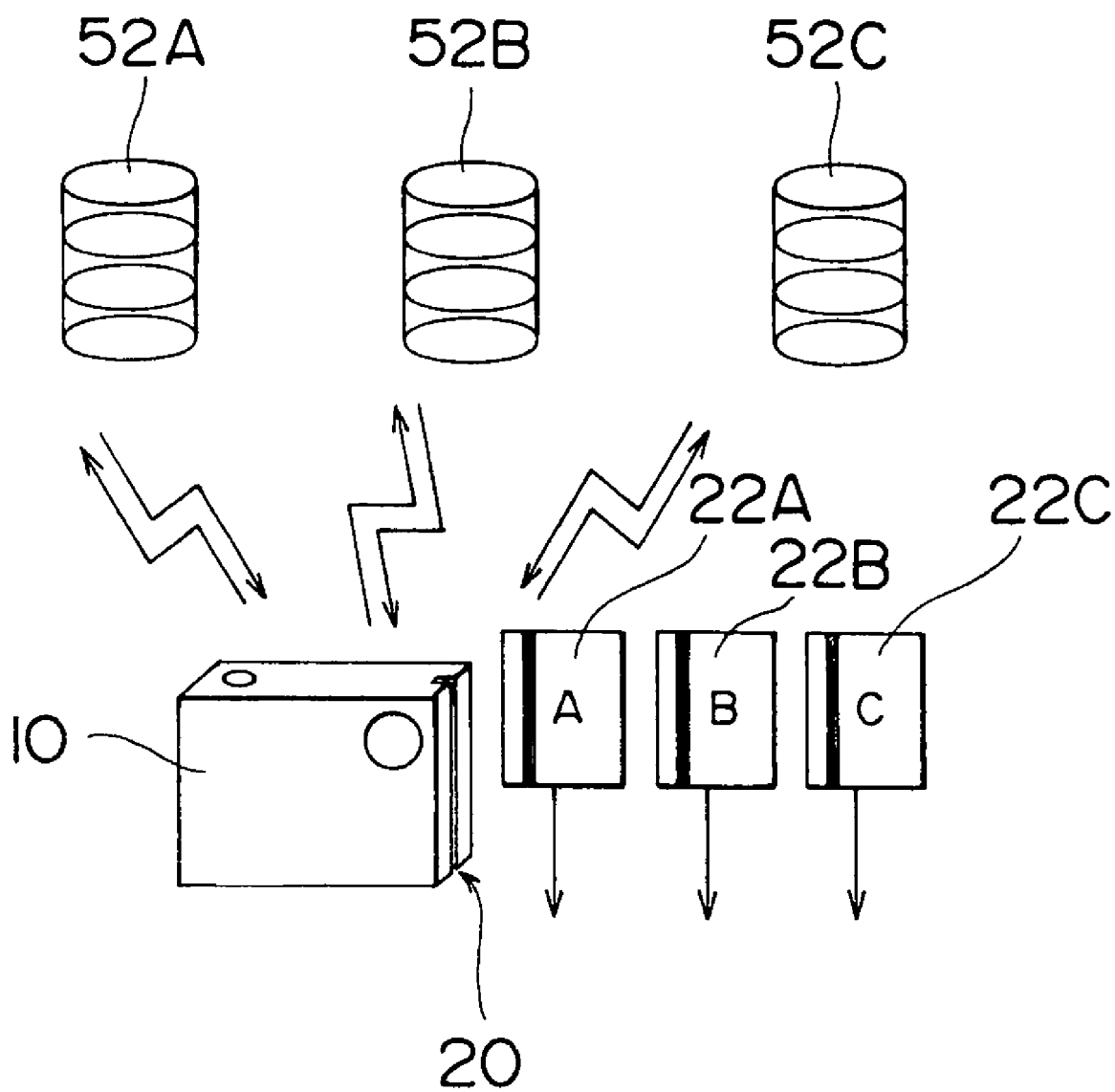
FIG. 12 is a conceptional view describing an example in which the identification information of a plurality of persons is set as the user's identification information in one camera.

FIG. 12 is a conceptional view in which identification information of a plurality of persons is set as the user's identification information in the camera 10. FIG. 12 shows an example in which the identification information of three persons A, B & C is entered into the camera 10 from identification cards 22A, 22B & 22C. When the identification cards 22A, 22B & 22C are inserted sequentially into the card reading part 20 of the camera 10, the identification information about the three persons A, B & C contained in the identification cards 22A, 22B & 22C is read into the camera 10 and is set as the user's identification information. The persons A, B & C have their own data recording regions in the servers 52A, 52B & 52C, respectively.

If the image-recording is performed using the camera 10 in which the identification information of the plurality of persons is set as the user's identification information, the camera 10 connects simultaneously or sequentially to the servers 52A, 52B & 52C corresponding to the persons A, B & C at the time of the image-recording, and then the camera 10 distributes the image data of the recorded image to the servers 52A, 52B & 52C. Thus, the registration of persons who are subjects in a snapshot, etc. eliminates the necessity for extra printing.

Instead of connecting to the servers 52A, 52B & 52C, it is possible to transmit the image data to one server among them and distribute the image data from the one server to the other servers through the network.

Figure 13:
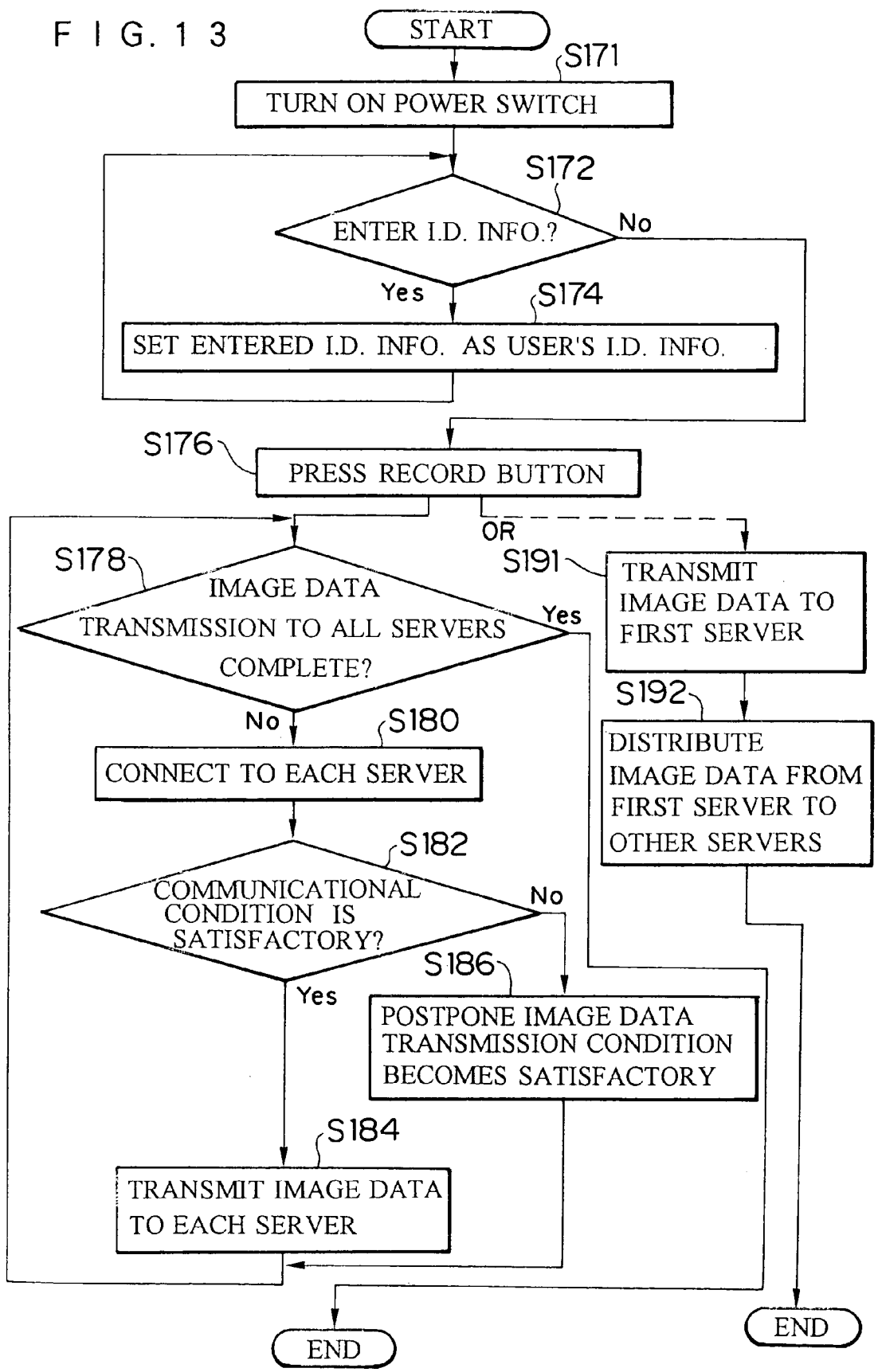
FIG. 13 is a flow chart showing the flow of an image-recording process in the case where the identification information of the plurality of persons is set as the user's identification information in the one camera.

FIG. 13 is a flow chart showing the flow of the above processing. When the power switch 19 of the camera 10 is turned on (S171), whether to enter the identification information to be set as the user's identification information is determined (S172). To enter the identification information, the identification card such as the credit card is inserted into the card reading part 20, and the identification information entered from the identification card 22 is set as the user's identification information (S174).

After the set of the user's identification information, the procedure returns to S172, and the processing from S172 through S174 is repeated until the identification information of the plurality of persons is set as the user's identification information. If no more identification information is entered at S172 after the identification information of the plurality of persons is set as the user's identification information, the command to perform the image-recording is waited.

When the record button 16 is pressed (S176), whether the data of the recorded image has already been transmitted to all servers designated with the set user's identification information is determined (S178). If the image data transmission to all servers is not completed, the camera connects to each of the severs 52A, 52B & 52C designated with the set user's identification information (S180).

After connecting to each of the servers 52A, 52B & 52C, the communicational condition is evaluated (S182). If satisfactory, the data of the recorded image is transmitted to each server and is recorded in a predetermined recording region (S184). If not satisfactory, the image data is transmitted to each server when the communicational condition becomes satisfactory (S186).

Then, the procedure returns to S178, and the processing from S178 through S186 is repeated until the image data transmission to all servers is completed. If the image data transmission is complete at S178, the procedure ends.

In another processing method, after the record button 16 is pressed at S176, the image data is transmitted to the first server that is designated with the first-set user's identification information (S191), and the image data is distributed from the first server to the other servers (S192).

All or a part of the user's identification information may be added to the data of the image recorded with the camera 10, in which the identification information of the plurality of persons is set as the user's identification information, and the image data with the information is recorded. Since the information of the user's identification information is a clue to recognize a person on a recorded image in a snapshot, it may be used to retrieve the images during the reproduction, etc.

In the above embodiments, the present invention is applied to the digital camera, but the present invention may also be applied to a variety of apparatuses provided with the image display function such as an LCD monitor apparatus and a personal digital assistant (PDA).

As set forth hereinabove, the image display apparatus of the present invention reads the identification information about the user from the external storage medium, and connects to the server designated in accordance with the read identification information. For this reason, the users can easily be registered in the apparatus, and the image data stored in the servers for the persons can be retrieved easily. It is also possible to clearly determine who will be charged for connecting to the server and for receiving the image data.

A plurality of image display apparatuses of the present invention can be used together. The identification information of one person is set as the user's identification information in the plurality of image display apparatuses, and one of the image display apparatuses is designated as the master that controls the entire image display apparatuses. Consequently, the same image can be observed at the same time on the plurality of image display apparatuses. For example, the image display apparatus may be used as a presentation tool, and it is possible to avoid the conventional inconvenience when some persons look at one monitor.

The camera of the present invention reads the identification information about the user from the external storage medium, and connects to the server designated in accordance with the read identification information so that the data of the recorded image can be transmitted to the server. Thus, the users can easily be registered in the camera. If a person uses a camera of another person, he or she can transmit the data of the recorded image automatically to his or her server. Moreover, it is easy to know who should be charged for using the server, etc. and the user is properly required to pay the charges. Since the recorded image data is stored in the server, there is no necessity for providing a device that stores a large amount of data in the camera. For this reason, a number of pictures can be taken without paying attention to the amount of the recorded data.

A plurality of cameras of the present invention can be used together. The identification information of one person is set as the user's identification information in the plurality of cameras, and one of the cameras is designated as the master that controls the entire cameras. Consequently, the one camera can control the image-recording in the plurality of cameras, and thus, the synchronous image-recording such as the panoramic photography and the 360° photography can be performed easily.

In addition, the identification information of a plurality of users is set in one camera so that the data of the recorded image can be distributed to each user at the same time. This eliminates the necessity for extra printing in the snapshot.

The identification information is added to the image data so that a person on the recorded image can be recognized easily. Moreover, the identification information added to the image data is helpful for retrieving the images.

In the image communication system of the present invention, the image apparatus connects to the server designated in accordance with the identification information of the user read from the external recording medium. For this reason, it is easy to receive the image data from each server and store the recorded image data in each server. In particular, it is possible to properly charge the user for using the network and the server in accordance with the identification information read by the information reader.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera comprising:
an imaging part provided with an imaging optical system and an imaging device, an image of a subject being formed on a light receiving surface of the imaging device through the imaging optical system, the imaging device photoelectrically converting the image into an image signal;
a signal processor for processing the image signal sent from the imaging device so as to produce image data;
a storage device for storing owner identification information and user identification information;
an information reader for reading identification information from an external storage medium, the read identification information being different from the owner identification information and set as the user identification information;

a communicating device for communicating with a server through a network, the server being designated in accordance with the identification information last read; and a data transmitter for transmitting the image data to the server.

2. The camera as defined in claim 1, further comprising an image display for displaying a first image captured by the imaging part and a second image represented by image data distributed from the server.

3. The camera as defined in claim 1, further comprising an information adding device for adding the read identification information to the image data.

4. The camera as defined in claim 3, further comprising an image data retrieving device for retrieving the image data in accordance with the added identification information.

5. A camera comprising:

an imaging part provided with an imaging optical system and an imaging device, an image of a subject being formed on a light receiving surface of the imaging device through the imaging optical system, the imaging device photoelectrically converting the image into an image signal;

a signal processor for processing the image signal sent from the imaging device so as to produce image data;

an information reader for reading identification information from an external storage medium;

a communicating device for communicating with a server through a network, the server being designated in accordance with the read identification information; and a data transmitter for transmitting the image data to the server;

a communicational condition evaluating device for determining whether condition of the communication of the communicating device with the server is satisfactory; and a communication postponing device for, if the communicational condition evaluating device determines that the condition is unsatisfactory, postponing the communication of the communicating device with the server until the communicational condition evaluating device determines that the condition becomes satisfactory.

6. A camera comprising:

an imaging part provided with an imaging optical system and an imaging device, an image of a subject being formed on a light receiving surface of the imaging device through the imaging optical system, the imaging device photoelectrically converting the image into an image signal;

a signal processor for processing the image signal sent from the imaging device so as to produce image data;

an information reader for reading identification information from an external storage medium;

a communicating device for communicating with a server through a network, the server being designated in accordance with the read identification information; and a data transmitter for transmitting the image data to the server;

a camera communicating device for communicating with at least one additional cameras reading the same identification information that the camera reads; and a cooperative mode designating device for designating the camera in either of a master mode and a slave mode with respect to the additional cameras;

wherein the camera supervises the additional camera through the camera communicating device when the camera is in the master mode;

wherein the camera is supervised by one of the additional cameras through the camera communicating device when the camera is in the slave mode, the one of the additional cameras being designated in the master mode by the cooperative mode designating device thereof.

7. A camera comprising:

an imaging part provided with an imaging optical system and an imaging device, an image of a subject being formed on a light receiving surface of the imaging device through the imaging optical system, the imaging device photoelectrically converting the image into an image signal;

a signal processor for processing the image signal sent from the imaging device so as to produce image data;

an information reader for reading identification information from an external storage medium;

a communicating device for communicating with a server through a network, the server being designated in accordance with the read identification information; and a data transmitter for transmitting the image data to the server;

an identification information storage device for storing identification information of a plurality of persons read by the information reader; and a communication controller for controlling the communicating device and the data transmitter such that the communicating device communicates with the server designated in accordance with the read identification information of each of the persons and the data transmitter transmits the image data to the designated server.

8. A camera comprising:

an imaging part provided with an imaging optical system and an imaging device, an image of a subject being formed on a light receiving surface of the imaging device through the imaging optical system, the imaging device photoelectrically converting the image into an image signal;

a signal processor for processing the image signal sent from the imaging device to produce image data;

an information reader for reading identification information from an external storage medium;

a nonvolatile storage device for storing identification information of an owner of the camera;

a user's identification information setting device for setting the owner's identification information as user's identification information if the information reader reads no identification information, and setting the identification information read by the information reader as the user's identification information if the information reader reads the identification information;

a communicating device for communicating with a server through a network, the server being designated in accordance with the user's identification information; and a data transmitter for transmitting the image data to the server.

9. The camera as defined in claim 8, further comprising a user's identification information erasing device for erasing the user's identification information when the camera is turned off.

10. The camera as defined in claim 8, further comprising a user's identification information updating device for, when the information reader reads a new identification information, erasing the set user's identification information and setting the new identification information as the user's identification information.

11. The camera as defined in claim 8, further comprising a user's identification information confirmation device for, if the set user's identification information is other than the owner's identification information, requiring resetting of the user's identification information when a first preset time has elapsed after the setting of the set user's identification information, and erasing the set user's identification information when a second preset time has elapsed without the resetting after the requirement.

* * * * *